United States Patent
Wang et al.

(10) Patent No.: US 7,316,890 B2
(45) Date of Patent: Jan. 8, 2008

(54) INDOLESTYRYL COMPOUND FOR USE IN RECORDING MEDIA AND METHOD FOR FABRICATION THEREOF

(75) Inventors: Shin-Shin Wang, Hsinchu (TW);
Hui-Ping Tsai, Hsinchu (TW);
Chii-Chang Lai, Feng-Yuan (TW);
Jie-Hwa Ma, Hsinchu (TW);
Jong-Lieh Yang, Hsinchu (TW);
Tzuan-Ren Jeng, Hsinchu (TW);
Wen-Yih Liao, Taichung (TW);
Chien-Liang Huang, Taoyuan (TW);
Ming-Chia Lee, Taichung Hsien (TW);
Chuen-Fuw Yan, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 520 days.

(21) Appl. No.: 10/831,803

(22) Filed: Apr. 26, 2004

(65) Prior Publication Data

US 2005/0064335 A1 Mar. 24, 2005

(30) Foreign Application Priority Data

Sep. 23, 2003 (TW) .............................. 92126164 A

(51) Int. Cl.
*G11B 7/24* (2006.01)
*C09B 23/14* (2006.01)

(52) U.S. Cl. ................ 430/270.18; 430/945; 428/64.8; 548/490

(58) Field of Classification Search ..................... None
See application file for complete search history.

(56) References Cited

U.S. PATENT DOCUMENTS 3,125,447 A * 3/1964 Stewart ........................ 430/92
3,833,863 A * 9/1974 Webster et al. ............... 372/53
4,563,406 A * 1/1986 Ohbayashi et al. .......... 430/513

(Continued)

FOREIGN PATENT DOCUMENTS

DE 68919131 T2 6/1989

(Continued)

OTHER PUBLICATIONS

Brooker et al. "Color and Constitution. VII. Interpretation of absorptions of dyes containing . . ."J. Am. Chem. Soc., vol. 67 pp. 1875-1889 (Nov. 1945).*

(Continued)

*Primary Examiner*—Martin Angebranndt
(74) *Attorney, Agent, or Firm*—Thomas, Kayden, Horstemeyer & Risley

(57) ABSTRACT

Indolestyryl compounds and use thereof for a high density recording media and method for fabricating the same. The indolestyryl compounds exhibit strong absorbance in the visible light region (400~700 nm) of the spectrum, resistance to heat and light, high light sensitivity, and excellent solubility, resulting from their special chemical configuration. Furthermore, the indolestyryl compounds can be used as recording layer materials in high density recording media for matching a reading laser wavelength and enhancing the reflective index and carrier-to-noise ratio (CNR) of the high density recording media. Accordingly, the recording sensitivity and the readout characteristics of high density recording media comprising the indolestyryl compound according to the present invention can be improved.

23 Claims, 4 Drawing Sheets

U.S. PATENT DOCUMENTS 4,708,922 A * 11/1987 Yokoya et al. ............... 430/73
6,815,031 B2 * 11/2004 Huang et al. ............. 428/64.1
7,014,981 B2 * 3/2006 Wang et al. .......... 430/270.19

FOREIGN PATENT DOCUMENTS

| | | |
|---|---|---|
| DE | 69902111 T2 | 2/1999 |
| DE | 60004970 T2 | 12/2000 |
| DE | 10249654 A1 | 10/2002 |
| EP | 1130063 A1 | 5/2001 |
| EP | 1156084 A2 | 11/2001 |
| EP | 1170339 A2 | 8/2002 |
| FR | 1517402 | 3/1967 |
| JP | 58-004142 | * 1/1983 |
| JP | 1-134489 | 5/1989 |
| JP | 01-257843 | * 10/1989 |
| JP | 06-230519 | * 8/1994 |
| JP | 11-099747 | * 4/1999 |
| JP | 11-170695 | * 6/1999 |
| JP | 2001-226605 | * 8/2001 |
| JP | 2003-321450 | * 11/2003 |

OTHER PUBLICATIONS

Germany Office Action.
Abstract of JP 11-170695.

* cited by examiner

INDOLESTYRYL COMPOUND FOR USE IN RECORDING MEDIA AND METHOD FOR FABRICATION THEREOF

BACKGROUND OF THE INVENTION

1. Field of the Invention

The invention relates to a high density recording media. More particularly, the present invention relates to a high-density recording media using idolestyryl compounds.

2. Description of the Related Art

Several theories and methods have been disclosed with regard to increasing the recording density of optical recording media. Chief among these theories and methods is shortening the wavelength of reading laser beams. For example, blue-laser sensitive dyes as recording layer materials are being substituted for red-laser sensitive dyes. Another topic of research is to modify the structures of organic dyes in order to develop organic dyes with excellent solubility, strong absorbance in the visible region, resistance to heat and light, high light sensitivity, and easy preparation.

Recordable compact discs (CD-Rs) have become a popular recording medium due to their low cost, portability, and compatibility between computer platforms. As soon, related research has been undertaken in order to further increase the recording capacity thereof. As a result, high-density recording media, such as recordable digital versatile discs (DVD-R) with recording capacity of 4.7 GB, have been developed and provided to meet massive data storage requirements. The organic dyes used as recording layer materials for CD-Rs, however cannot be used for DVD-Rs, as the wavelength of the laser beam employed for reading a CD-R (about 780 nm) is different from that employed for reading a DVD-R (about 650 nm).

Recently, several organic dyes, serving as recording layer materials, have been developed. Due to low resistance to heat and light, insolubility, and complex preparation steps for conventional organic dyes, however high-density recording media employing the same have poor storage life, high cost and are difficult to fabricate. Therefore, a novel organic dye for use in high-density recording media is desirable.

SUMMARY OF THE INVENTION

Accordingly, an object of the present invention is to provide an indolestyryl compound for use as a recording layer material in high-density recording media. Indolestyryl compounds according to the present invention exhibit strong absorbance in the visible light region (400 to 700 nm) of the spectrum, resistance to heat and light, high light sensitivity, and excellent solubility, resulting from their special chemical configuration. Therefore, indolestyryl compounds are well suited to serve as materials for recording layers, with readout wavelengths corresponding to reading laser beams, easily fabricated by spin coating.

Another object of the present invention is to provide high-density recording media comprising the described indolestyryl compounds as recording layer materials. The indolestyryl compound, having advantages of easy preparation and simple purification, is available in great quantity, such that the cost of the high-density recording media employing the same can be greatly reduced. In the high-density recording media according to the present invention, due to the particular configuration of the indolestyryl compound, the reflective index (more than 60%) and carrier-to-noise ratio (CNR) thereof is dramatically improved from 45% to more than 60% and from 45 dB to more than 50 dB (at a measured writing power of more than 9 mW) respectively, compared with high-density recording media. Additionally, the high-density recording media has a high absorption coefficient (more than $8 \times 10^4$ cm$^{-1}$) under irradiation with visible light.

Still another object of the present invention is to provide a method for fabricating high-density recording media, comprising indolestyryl compound as a recording layer material, according to the present invention. Since the indolestyryl compound employed by the present invention can be dissolved by organic solvent with better solubility than the conventional recording layer materials for high-density recording media, the recording layer comprising the indolestyryl compounds can be formed by spin coating, dip coating, tape coating or spray coating.

To achieve these objects, the indolestyryl compounds according to the present invention comprise the structures represented by formula (I):

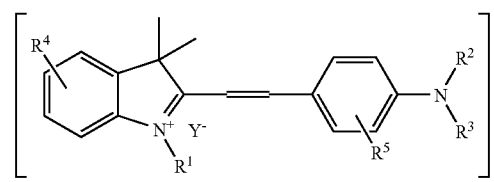

or formula (II):

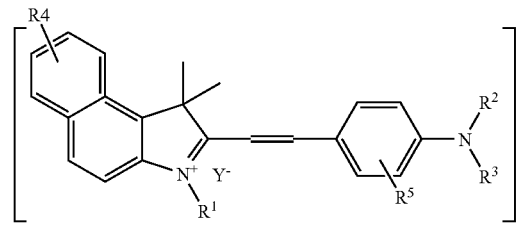

Accordingly, $R^1$ can be —$CH_2C_6H_4CO_2R^6$, —$CH_2SO_2C_6H_5$, —$CH_2C_6H_5$, —$(CH_2)_nCO_2R^6$, —$(CH_2)_nSO_3R^6$, α-naphthylmethyl, and β-naphthylmethyl, wherein n is 1~8, and $R^6$ can be substituted or unsubstituted alkyl group, fluoroalkyl group, polycyclic alkyl group, aryl group, fluoroaryl group, naphthyl group or —$C_6H_4SCH_3$.

$R^2$ and $R^3$ can be the same or different and comprised hydrogen atom, substituted or unsubstitued alkyl group having 1 to 8 carbon atoms, substituted or unsubstitued alkoxy group having 1 to 8 carbon atoms, or alkoxycarbonyl group, and $R^2$ and $R^3$ optionally comprise a heterocycloalkyl group, hetero-polycycloalkyl group, or heteroaryl group, with N or aniline bonded thereby.

$R^4$ and $R^5$ can be the same or different and comprised hydrogen atom, alkyl group, alkoxy group, fluoroalkyl group, halogen atom, nitro group, carboxylic group, acyl group, sulfonic acid group, sulfonyl group, sulfoamide group, amino group, or amide group.

$Y^-$ can be teteacyano p-quinodimethane (TCNQ$^-$), tetracyanoetylene (TCNE$^-$), $ClO_4^-$, $SbF_6^-$, $PF_6^-$, $BF_4^-$, halogen anion, $HSO_3^-$, $HSO_4^-$, or organometallic anion.

In addition, at least one hydrogen atom bonded to the carbon atom of the indolestyryl compound according to formula (I) or formula (II) can be substituted optionally by a halogen atom, carboxylic group, acyl group, nitro group, amino group, amide group, sulfonic acid group, sulfonyl group, sulfonamide group, alkyl group, alkoxy group, alkoxycarbonyl group, or fluoroalkyl group, wherein the amide group can be —$CON(R'')_2$, sulfonyl group —$SO_3R''$ and sulfoamide group —$SO_2N(R'')_2$, and R" is a hydrogen atom or alkyl group having 1 to 8 carbon atoms.

To achieve another object of the present invention, a high-density recording media using indolestyryl compound for a recording layer material is provided. The high-density recording media comprises a first substrate with a plurality of lands and grooves, a recording layer formed on the first substrate, a reflective layer formed on the recording layer, and a second substrate formed on the reflective layer, wherein the recording layer comprises indolestyryl compounds according to formula (I) or (II).

In the present invention, the distance between lands is 0.3 to 0.8 μm, and the depth of grooves is 70 to 200 nm. Moreover, the high-density recording media can further comprise an adhesive layer formed between the reflective layer and the second substrate to facilitate the bond therebetween.

The present invention additionally provides a method for fabricating high-density recording media according to the present invention, comprising the following steps.

First, a first substrate is provided.

Next, a recording layer comprising indolestyryl compounds, according to formula (I) or (II), is formed on the first substrate.

Next, a reflective layer is formed on the recording layer.

Finally, a second substrate is formed on the reflective layer.

In the present invention, the steps for forming the recording layer on the first substrate comprise:

A indolestyryl compound according to formula (I) or (II) is provided to dissolve in a solvent to yield an indolestyryl compound solution.

Next, the indolestyryl compound solution is coated on the first substrate to form the recording layer, which is then subjected to a baking process.

In order to understand the above and other objects, characteristics and advantages, the preferred embodiments and comparative embodiments of the present invention are now described with reference to the accompanying drawings.

BRIEF DESCRIPTION OF THE DRAWINGS

The present invention is more fully understood by reading the subsequent detailed description and examples with references made to the accompanying drawings, wherein.

DETAILED DESCRIPTION OF THE INVENTION

Figure 1:
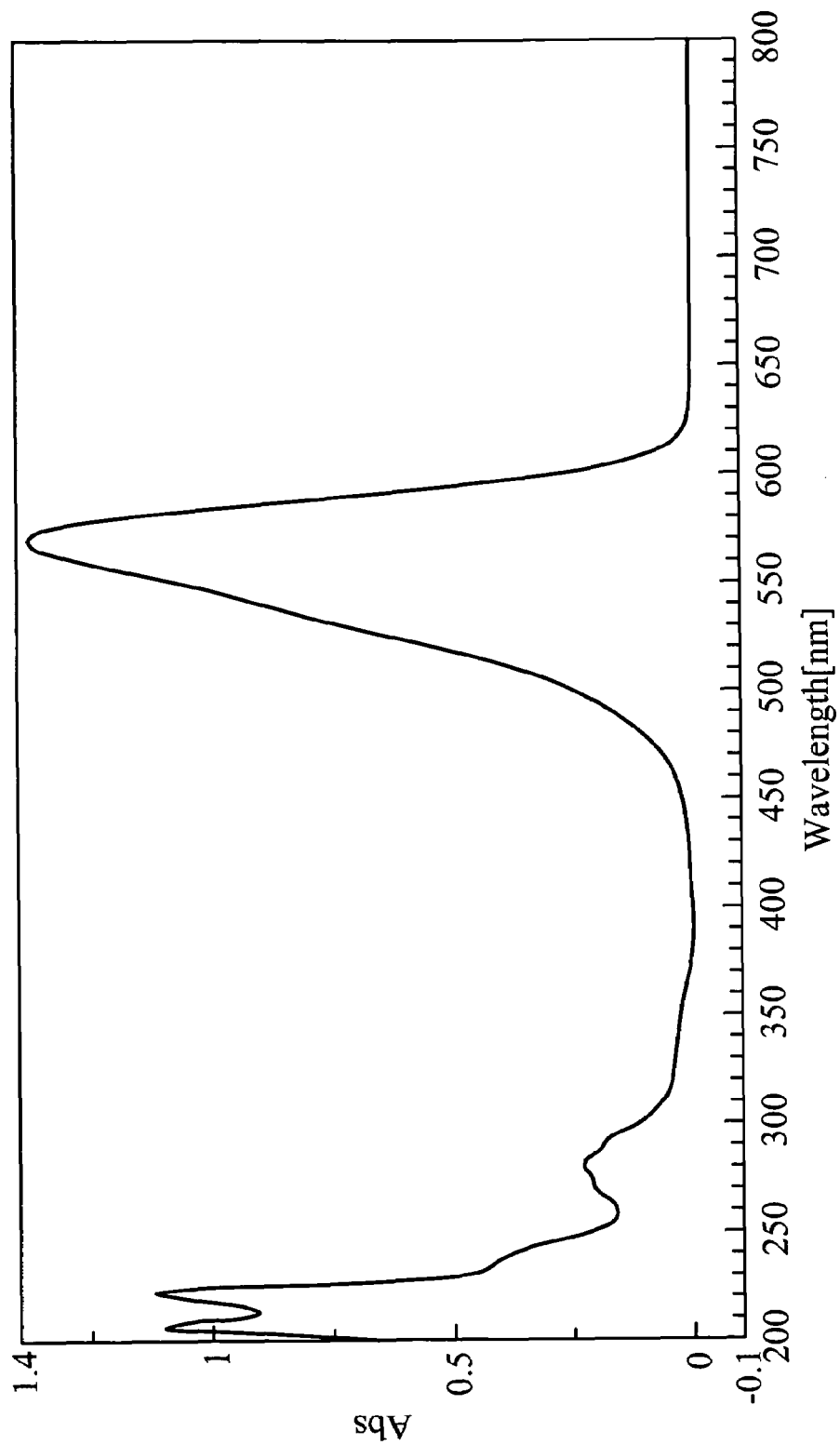
FIGS. 1, 2, and 3 are ultraviolet absorption spectrums of Compound (3), Compound (5), and Compound (12), respectively.

The recording layer materials used in the present invention can be indolestyryl compounds, according to formula (I) or (II), comprising the following compounds shown in Table 1. In addition, the maximum absorption wavelength and absorption coefficient thereof are also evaluated and shown in Table 1.

TABLE 1

| | Chemical structure | $\lambda_{max}$ (nm) | Absorption Coefficient (cm$^{-1}$) |
|---|---|---|---|
| Compound (1) | | 568 | 1.69 × 10$^5$ |
| Compound (2) | | 568 | 2.76 × 105 |

TABLE 1-continued

| | Chemical structure | $\lambda_{max}$ (nm) | Absorption Coefficient (cm$^{-1}$) |
|---|---|---|---|
| Compound (3) | | 568 | 1.12 × 10$^5$ |
| Compound (4) | | 568 | 4.6 × 10$^5$ |
| Compound (5) | | 567 | 1.11 × 10$^5$ |
| Compound (6) | | 572 | 1.13 × 10$^5$ |

TABLE 1-continued

| | Chemical structure | $\lambda_{max}$ (nm) | Absorption Coefficient (cm$^{-1}$) |
|---|---|---|---|
| Compound (7) | | 569 | 1.43 × 10$^5$ |
| Compound (8) | | 566 | 7.2 × 10$^4$ |
| Compound (9) | | 568 | 1.72 × 10$^5$ |
| Compound (10) | | 568 | 5.9 × 10$^4$ |

TABLE 1-continued

| | Chemical structure | $\lambda_{max}$ (nm) | Absorption Coefficient ($cm^{-1}$) |
|---|---|---|---|
| Compound (11) | | 544.5 | $8.13 \times 10^4$ |
| Compound (12) | | 564.5 | $1.18 \times 10^5$ |
| Compound (13) | | 566 | $1.23 \times 10^5$ |
| Compound (14) | | 562 | $9.35 \times 10^4$ |
| Compound (15) | | 589 | $1.42 \times 10^5$ |

TABLE 1-continued

| | Chemical structure | $\lambda_{max}$ (nm) | Absorption Coefficient (cm$^{-1}$) |
|---|---|---|---|
| Compound (16) | | 586 | 6.5 × 10$^4$ |
| Compound (17) | | 587 | 1.62 × 10$^5$ |
| Compound (18) | | 582 | 1.51 × 10$^5$ |
| Compound (19) | | 584 | 1.41 × 10$^5$ |

TABLE 1-continued
| | Chemical structure | $\lambda_{max}$ (nm) | Absorption Coefficient (cm$^{-1}$) |
|---|---|---|---|
| Compound (20) | | 558 | 7.69 × 10$^4$ |
| Compound (21) | | 577 | 1.8 × 10$^5$ |
| Compound (22) | | 597 | 2.1 × 10$^5$ |
| Compound (23) | | 556 | 5.9 × 10$^4$ |
According to one aspect of the present invention, the method of preparing indolestyryl compounds according to formula (I) or formula (II) is described in detail shown as below.
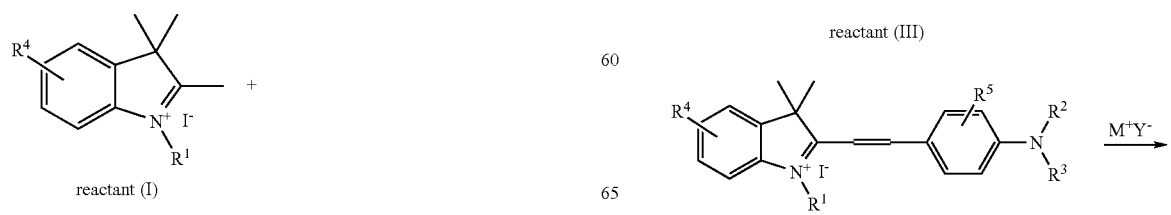

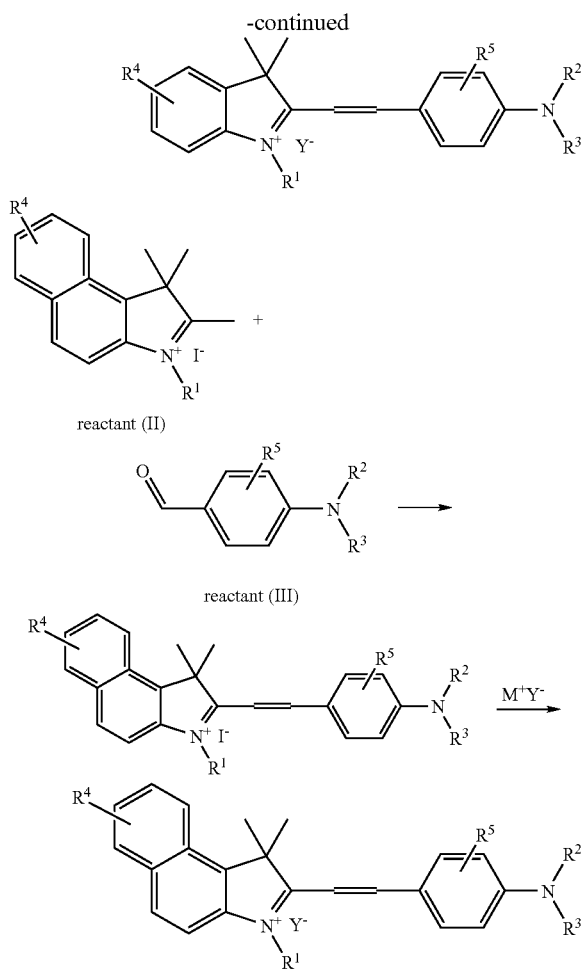

reactant (II)

reactant (III)

Accordingly, $R^1$ can be $-CH_2C_6H_4CO_2R^6$, $-CH_2SO_2C_6H_5$, $-CH_2C_6H_5$, $-(CH_2)_nCO_2R^6$, $-(CH_2)_nSO_3R^6$, α-naphthylmethyl, and β-naphthylmethyl, wherein n is 1~8, and $R^6$ can be substituted or unsubstituted alkyl group, fluoroalkyl group, polycyclic alkyl group, aryl group, fluoroaryl group, naphthyl group or $-C_6H_4SCH_3$.

$R^2$ and $R^3$ can the different and comprised hydrogen atom, substituted or unsubstituted alkyl group having 1 to 8 carbon atoms, substituted or unsubstituted alkoxy group having 1 to 8 carbon atoms, or alkoxycarbonyl group, and $R^2$ and $R^3$ optionally comprise a heterocycloalkyl group, hetero-polycycloalkyl group, or heteroaryl group, with N or aniline bonded thereby.

$R^4$ and $R^5$ can be the same or different and comprised hydrogen atom, alkyl group, alkoxy group, fluoroalkyl group halogen atom, nitro group, carboxylic group, acyl group, sulfonic acid group, sulfonyl group, sulfoamide group, amino group or amide group.

$Y^-$ can be teteacyano p-quinodimethane ($TCNQ^-$), tetracyanoetylene ($TCNE^-$), $ClO_4^-$, $SbF_6^-$, $PF_6^-$, $BF_4^-$, halogen anion, $HSO_3^-$, $HSO_4^-$, or organometallic anion.

$M^+$ can be $Li^+$, $Na^+$, or $K^+$.

In addition, at least one hydrogen atom bonded to the carbon atom of the indolestyryl compound according to formula (I) or formula (II) can be substituted optionally by a halogen atom, carboxylic group, acyl group, nitro group, amino group, amide group, sulfonic acid group, sulfonyl group, sulfonamide group, alkyl group, alkoxy group, alkoxycarbonyl group, or fluoroalkyl group, wherein the amide group can be $-CON(R'')_2$, sulfonyl group $-SO_3R''$ and sulfoamide group $-SO_2N(R'')_2$, and $R''$ is a hydrogen atom or alkyl group having 1 to 8 carbon atoms.

First, a mixture of reactant (I), reactant (II) and a suitable solvent, such as methanol, is added into a reaction flask at room temperature. After mixing completely, alkali-salt ($M^+Y^-$), such as $NaSbF_6$ or $NaClO_4$, is added in the resulting mixture to heat and reflux for 10-20 hours with stirring. After cooling, the resulting mixture is subjected to filtered and dried, providing indolestyryl compounds according to the present invention.

The described indolestyryl compounds are well suited to serve as materials for recording layers of high-density recording media, preferably digital versatile discs (DVD). At least one indolestyryl compound according to formula (I) or formula (II) can serve as a recording layer material of high-density recording media. Moreover, the described indolestyryl compound can also serve as a recording layer material for high-density recording media by mixing with other organic dyes.

Figure 4:
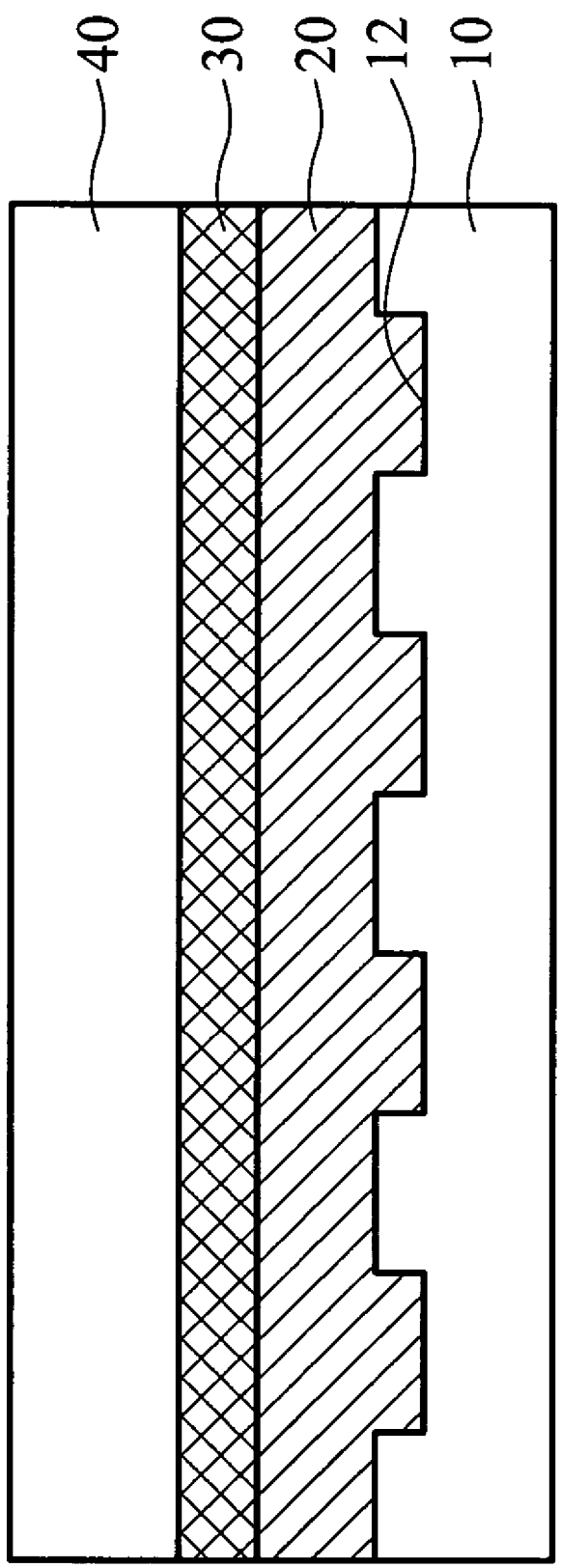
FIG. 4 is a schematic diagram of a high-density recording media according to the present invention.

In another aspect of the invention, the method for fabricating high-density recording media, such as high-density optical discs, comprising the indolestyryl compound according to the present invention is described in detail as below, referring to FIG. 4.

A first substrate 10 with a plurality of grooves 12 is provided. Next, at least one indolestyryl compound according to formula (I) or (II) is provided to dissolve in an organic solvent to yield an indolestyryl compound solution. Next, the indolestyryl compound solution is coated on the first substrate 10, and subjected to a baking process to form a recording layer 20. Next, a reflective layer 30 is formed on the recording layer 20. Finally, a second substrate 40 is formed on the reflective layer 30, wherein the second substrate 40 can be a polymer film. Moreover, before forming the second substrate 40 on the reflective layer 30, an adhesive layer can be formed on the reflective layer 30 to facilitate the bond between the reflective layer 30 and the second substrate 40.

In the present invention, suitable material for the first substrate 10 is a transparent insulating material, such as polyester (PE), polycarbonate (PC), or polymethylmthacrylate (PMMA). The second substrate 40 can be the same material as the first substrate 10.

According to the present invention, the organic solvent for dissolving the indolestyryl compound, can be alcohol, ketone, ether, halogen compound, cycloalkane or amide. The alcohol can be alcohol having 1 to 6 carbon atoms, such as methanol, ethanol, isopropanol, diacetonalcohol, 2,2,3,3-tetrafluoropropanol, trichloroethanol, 2-chloroethanol, octafluoropentanol, or hexafluorobutanol. The ketone can be acetone, methyl isobutyl ketone (MIBK), methyl ethyl ketone (MEK), or 3-hydroxy-3-methyl-2-butanone. The cycloalkane can be methylcyclohexane (MCH). The halogen compound can be chloroform, dichloromethane, or 1-chlorobutane. The amide can be dimethylformamide (DMF), or dimethylacetamide (DMA). To meet requirements for high-density optical discs, the material of the reflective layer can be Au, Ag, Al, Cu, Ti, Cr or alloys thereof.

Additionally, the indolestyryl compound solution can be coated on the first substrate 10 by spin coating, dip coating, embossing, stamping, thermal evaporation, or spray coating, with spin coating, at a spinning speed of 500 to 5000 rpm, being preferable. The recording layer has a thickness of about 50 nm to 300 nm, preferably 70 nm to 250 nm.

The following embodiments are intended to clarify the invention more fully without limiting the scope of the claims, since numerous modifications and variations will be apparent to those skilled in this art.

Preparation of Indolestyryl Compounds

The following discloses the compound structures, and symbols for the compounds in the embodiments of the present invention for better understanding.

A1:

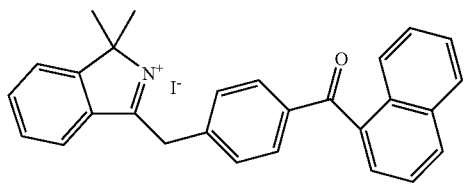

A2:

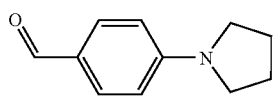

A3:

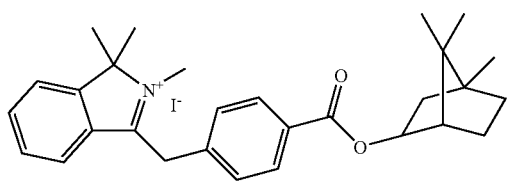

A4:

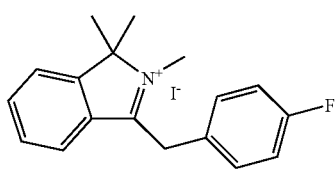

EXAMPLE 1

Compound (3) Synthesis:

3.0 g of A1, 2.8 g of NaSbF$_6$ and 45 ml of methanol were added into a round-bottom flask and heated to reflux. After refluxing for 48 hours with stirring, 1.06 g of A2 was added into the resulting mixture and heated to reflux for 18 hours. After cooling, the resulting mixture was filtered and dried, yielding indolestyryl Compound (3). The compound exhibited an absorption wavelength ($\lambda_{max}$) of 568 nm and an absorption coefficient ($\epsilon$) of $1.12 \times 10^5$ cm$^{-1}$. FIG. 1 is an ultraviolet absorption spectrum of Compound (3).

EXAMPLE 2

Figure 2:
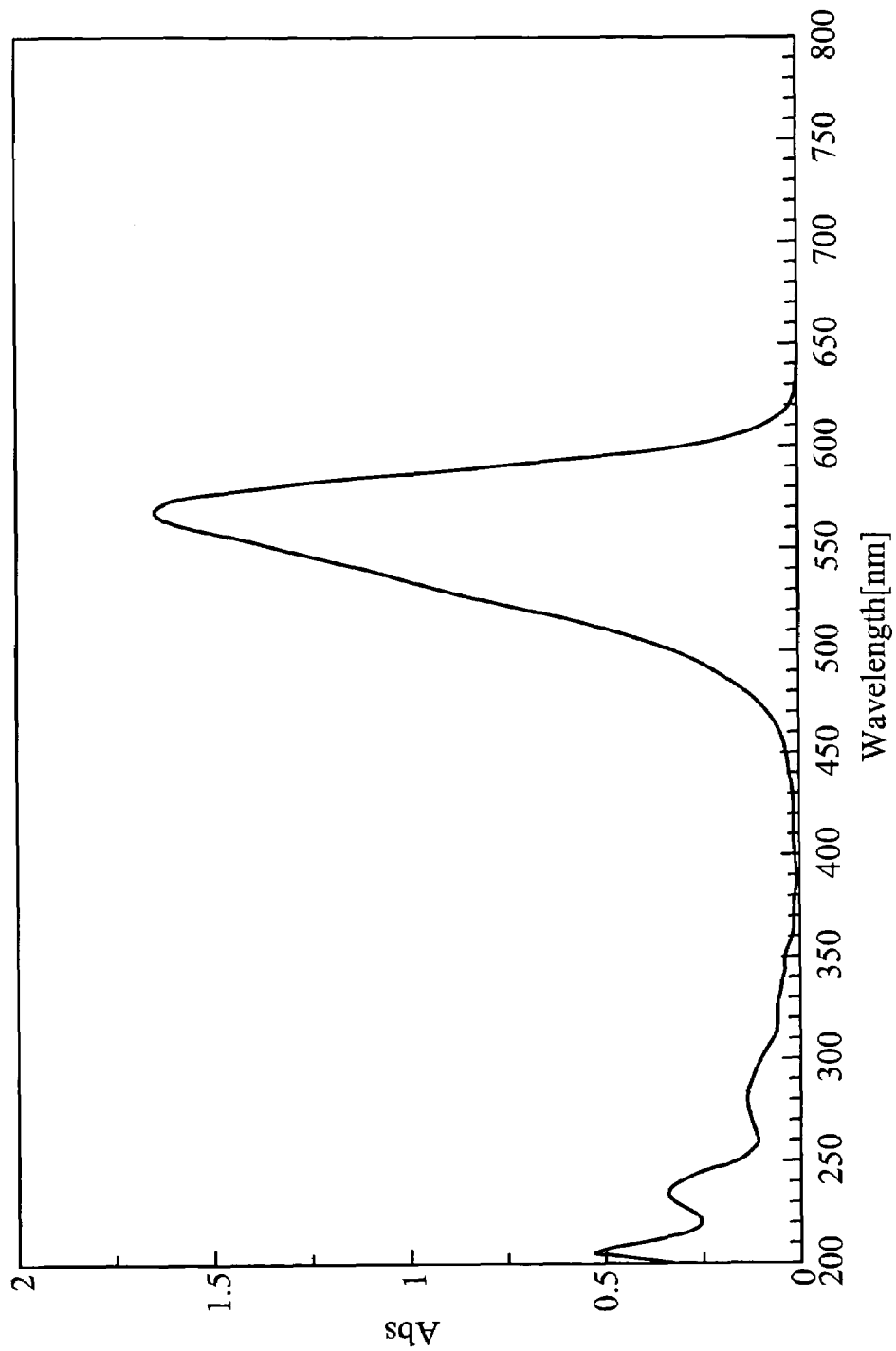

Compound (5) Synthesis:

1.3 g of A3, 0.46 g of A2 and 30 ml of ethanol were added into a round-bottom flask and heated to reflux. After refluxing for 16 hours with stirring, 1.08 g of NaSbF$_6$ was added into the resulting mixture and heated to reflux for 18 hours. After cooling, the resulting mixture was filtered and dried, yielding indolestyryl Compound (5), as a green solid. The compound exhibited an absorption wavelength ($\lambda_{max}$) of 567 nm and an absorption coefficient ($\epsilon$) of $1.11 \times 10^5$ cm$^{-1}$. FIG. 2 is an ultraviolet absorption spectrum of Compound (5).

EXAMPLE 3

Figure 3:
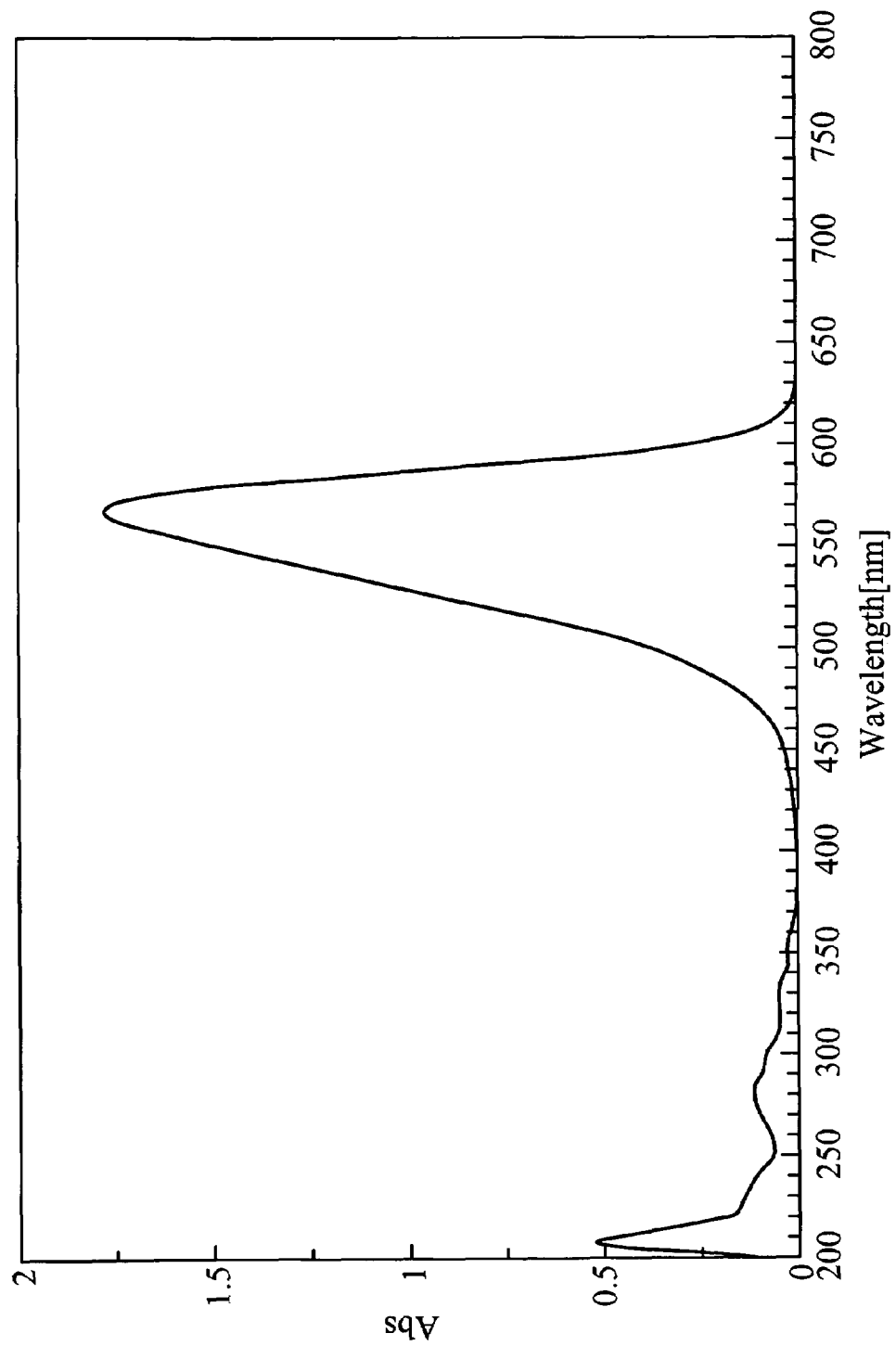

Compound (12) Synthesis:

10 g of A4, 4.88 g of A2 and 100 ml of ethanol were added into a round-bottom flask and heated to reflux. After refluxing for 16 hours with stirring, 5.58 g of NaSbF$_6$ was added into the resulting mixture and heated to reflux for 18 hours. After cooling, the resulting mixture was filtered and dried, yielding indolestyryl Compound (12), as a blue solid. The compound exhibited an absorption wavelength ($\lambda_{max}$) of 564.5 nm and an absorption coefficient ($\epsilon$) of $1.18 \times 10^5$ cm$^{-1}$. FIG. 3 is an ultraviolet absorption spectrum of Compound (12).

The indolestyryl compounds as shown in Table 1 consist of an indolestyryl cation and an anion, such as SbF6- or I—, wherein the anion thereof can optionally substitute for another anion, such as TCNQ-, TCNE-, ClO4-, SbF6-, PF6-, BF4-, F—, or Cl— by heating the indolestyryl compound and the compound having the anion, dissolved in a solvent, to reflux a period of time.

Fabrication of High-Density Optical Discs

EXAMPLE 4

Fabrication of High-Density Optical Disc (1):

First, 1.8 g of Compound (1) was dissolved in 2,2,3,3-tetrafluoropropanol to prepare a 100 g solution thereof.

The above solution was coated on a first polycarbonate (PC) substrate, with a thickness of 0.6 mm, having a plurality of lands and grooves by spin coating comprising a coating process and a swinging process, and subjected to a baking process to form a recording layer with a thickness of 70 nm to 250 nm. Herein, the coating process had a spinning speed of 30 to 500 rpm for 2 to 10 seconds, the swinging process had a spinning speed of 1000 to 3000 rpm for 10 to 20 seconds, and the baking process had a spinning speed of 3000 to 5000 rpm for 10 to 20 seconds.

Next, a reflective layer with a thickness of 50 to 250 nm, such as Ag or Au layer, was formed on the recording layer by thermal evaporation. Finally, a second polycarbonate (PC) substrate was bonded on the reflective layer to obtain High-density optical disc (1).

High-density optical disc (1) was evaluated by writing and reading with a disk tester "DDU-1000" (Pulstec Industrial Co., Ltd.). The writing conditions were as follows: constant linear velocity (CLV) was 3.5 m/s, objective lens numerical aperture (NA) was 0.6, wavelength of writing laser beam is 658 nm, and writing power is 7 to 14 mW. The reading conditions are the same as the writing conditions except for substitution of 7 to 14 mW of writing power for 0.5 to 1.5 mW.

The CNR values of high-density optical disc (1) under different writing powers were estimated and are shown in Table 2.

TABLE 2

| Writing Power (mW) | 7 | 8 | 9 | 10 | 11 | 12 | 13 | 14 |
|---|---|---|---|---|---|---|---|---|
| CNR (dB) | 35.9 | 45.7 | 53.3 | 56.0 | 57.1 | 57.8 | 58.5 | 58.1 |

According to Table 2, the CNR values of High-density optical disc (1) were more than 45 dB with a writing power of more than 8 mW.

EXAMPLE 5

Fabrication of High-Density Optical Disc (2):

Example 5 was the same performed as Example 4 except for substitution of Compound (1) for Compound (2). The CNR values of High-density optical disc (2) under different writing powers are estimated by the same procedure as Example 4 and shown in Table 3.

TABLE 3

| Writing Power (mW) | 7 | 8 | 9 | 10 | 11 | 12 | 13 | 14 |
|---|---|---|---|---|---|---|---|---|
| CNR (dB) | 49.1 | 53.7 | 55.5 | 57.3 | 58.0 | 58.1 | 58.1 | 57.6 |

According to Table 3, the CNR values of high-density optical disc (2) were more than 45 dB with a writing power of more than 7 mW, preferably more than 58 dB with a writing power of more than 10 mW.

EXAMPLE 6

Fabrication of High-Density Optical Disc (3):

Example 6 was performed the same as Example 4 except for substitution of Compound (1) for Compound (9). The CNR values of High-density optical disc (3) under different writing powers were estimated by the same procedure as Example 4 and are shown in Table 4.

TABLE 4

| Writing Power (mW | 7 | 8 | 9 | 10 | 11 | 12 | 13 | 114 |
|---|---|---|---|---|---|---|---|---|
| CNR (dB) | 40.4 | 46.4 | 49.7 | 52.5 | 53.1 | 55.7 | 55.9 | 54.5 |

According to Table 4, the CNR values of high-density optical disc (3) were more than 45 dB with a writing power of more than 8 mW.

Accordingly, the indolestyryl compounds according to the present invention exhibit strong absorbance in the visible light region of the spectrum, and high absorption coefficient, resulting from their special chemical configuration. Particularly, the R1 aryl side group of the indolestyryl compounds further assists in improving the resistance to heat and light, and the solubility thereof. Therefore, the indolestyryl compounds can be dissolved in an organic solvent, such as alcohol, ketone, ether, halogen compound, cycloalkane or amide, and serve as a recording layer material in the fabrication high-density recording media with high recording sensitivity, reflective index, and CNR value through a simple coating method, such as spray, roller, dip, or spin coating.

Moreover, due to the advantages of easy preparation and simple purification, the indolestyryl compounds according to the present invention are available in great quantity at lower cost when compared with the conventional recording layer materials used in DVDs.

In addition, the indolestyryl compounds can serve not only as recording layer materials for high-density recording media but also as photoresist in IC, fiber coloring in textiles, copy, and print.

While the invention has been described by way of example and in terms of the preferred examples, it is to be understood that the invention is not limited to the disclosed examples. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An indolestyryl compound having a formula (I), of:

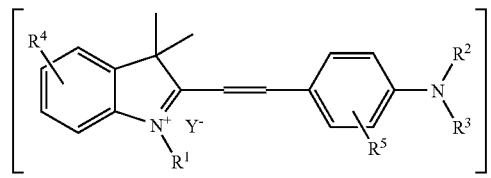

or formula (II), of:

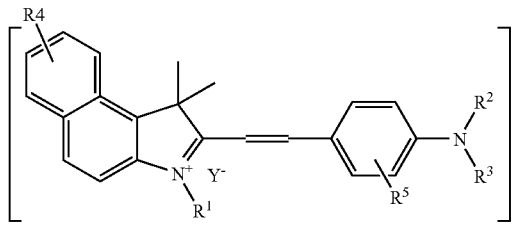

wherein $R^1$ is $-CH_2C_6H_4CO_2R^6$, $-CH_2SO_2C_6H_4F$, $-(CH_2)_n CO_2R^6$, $-(CH_2)_n SO_3R^6$, α-naphthylmethyl, or β-naphthylmethyl, wherein n is 1~8, and $R^6$ is polycyclic alkyl group, aryl group, fluoroaryl group, naphthyl group or $-C_6H_4SCH_3$, and $R^6$ is polycyclic alkyl group, fluoroaryl group, or $-C_6H_4SCH_3$ when $R^1$ is $-(CH_2)_n CO_2R^6$;

$R^2$ and $R^3$ are the same or different and comprised hydrogen atom, substituted or unsubstituted alkyl group having 1 to 8 carbon atoms, substituted or unsubstituted alkoxy group having 1 to 8 carbon atoms, or alkoxycarbonyl group, and $R^2$ and $R^3$ optionally comprise a heterocycloalkyl group, hetero-polycycloalkyl group, or heteroaryl group, with N or aniline bonded thereby;

$R^4$ and $R^5$ are the same or different and comprised hydrogen atom, alkyl group, alkoxy group, fluoroalkyl group, halogen atom, nitro group, carboxylic group, acyl group, sulfonic acid group, sulfonyl group, sulfoamide group, amino group or amide group;

$Y^-$ is tetracyano p-quinodimethane ($TCNQ^-$), tetracyanoethylene ($TCNE^-$), $ClO_4^-$, $SbF_6^-$, $PF_6^-$, $BF_4^-$, halogen anion, $HSO_3^-$, $HSO_4^-$, or organometallic anion; and at least one hydrogen atom bonded to the carbon atom of the indolestyryl compound according to formula (I) or formula (II) is substituted optionally by a halogen atom, carboxylic group, acyl group, nitro group, amino group, amide group, sulfonic acid group, sulfonyl group, sulfoamide group, alkyl group, alkoxy group, alkoxycarbonyl group or fluoroalkyl group.

2. The indolestyryl compound as claimed in claim 1, wherein $R^4$ is substituted optionally by $-CON(R'')_2$, $-SO_3R''$ or $-SO_2N(R'')_2$, and $R''$ is a hydrogen atom or alkyl group having 1 to 8 carbon atoms.

3. A high-density recording medium, comprising:
a first substrate;
a recording layer formed on the first substrate;
a reflective layer formed on the recording layer; and a second substrate formed on the reflective layer, wherein the recording layer comprises an indolestyryl compound having a formula (I), of:

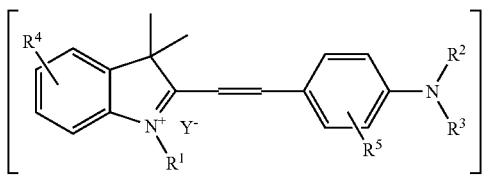

or formula (II), of:

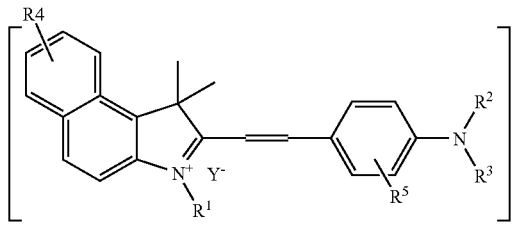

wherein $R^1$ is —$CH_2C_6H_4CO_2R^6$, —$CH_2SO_2C_6H_4F$, —$(CH_2)_n CO_2R^6$, —$(CH_2)_n SO_3R^6$, α-naphthylmethyl, or β-naphthylmethyl, wherein n is 1~8, and $R^6$ is polycyclic alkyl group, aryl group, fluoroaryl group, naphthyl group or —$C_6H_4SCH_3$, and $R^6$ is polycyclic alkyl group, fluoroaryl group, or —$C_6H_4SCH_3$ when $R^1$ is —$(CH_2)_nCO_2R^6$;

$R^2$ and $R^3$ are the same or different and comprised hydrogen atom, substituted or unsubstituted alkyl group having 1 to 8 carbon atoms, substituted or unsubstituted alkoxy group having 1 to 8 carbon atoms, or alkoxycarbonyl group, and $R^2$ and $R^3$ optionally comprise a heterocycloalkyl group, hetero-polycycloalkyl group, or heteroaryl group, with N or aniline bonded thereby;

$R^4$ and $R^5$ are the same or different and comprised hydrogen atom, alkyl group, alkoxy group, fluoroalkyl group, halogen atom, nitro group, carboxylic group, acyl group, sulfonic acid group, sulfonyl group, sulfoamide group, amino group or amide group;

$Y^-$ is tetracyano p-quinodimethane ($TCNQ^-$), tetracyanoethylene ($TCNE^-$), $ClO_4^-$, $SbF_6^-$, $PF_6^-$, $BF_4^-$, halogen anion, $HSO_3^-$, $HSO_4^-$, or organometallic anion; and at least one hydrogen atom bonded to the carbon atom of the indolestyryl compound according to formula (I) or formula (II) is substituted optionally by a halogen atom, carboxylic group, acyl group, nitro group, amino group, amide group, sulfonic acid group, sulfonyl group, sulfoamide group, alkyl group, alkoxy group, alkoxycarbonyl group or fluoroalkyl group.

4. The high-density recording medium as claimed in claim 3, wherein the high-density recording medium has a reflective index of more than 45%, an absorption coefficient of more than $8 \times 10^4$ cm$^{-1}$, and a carrier-to-noise ratio of more than 50 dB at a measured writing power of 9 mW.

5. The high-density recording medium as claimed in claim 3, wherein the first substrate comprises a plurality of lands and grooves, and the distance between lands is 0.3 to 0.8 μm and the depth of grooves is 70 to 200 nm.

6. The high-density recording medium as claimed in claim 3, further comprising an adhesive layer formed between the reflective layer and the second substrate.

7. The high-density recording medium as claimed in claim 3, wherein the material of the first substrate is the same as the second substrate and is polyester, polycarbonate, or polymethylmethacrylate.

8. The high-density recording medium as claimed in claim 3, wherein the thickness of the recording layer is 50 nm to 300 nm.

9. The high-density recording medium as claimed in claim 3, wherein the reflective layer is a layer of Au, Ag, Al, Cu, Ti, Cr or alloys thereof.

10. The high-density recording medium as claimed in claim 3, wherein the high-density recording medium is a high-density optical disc.

11. A method for fabricating a high density recording medium, comprising the following steps:

providing a first substrate;

forming a recording layer comprising an indolestyryl compound having a formula (I), of:

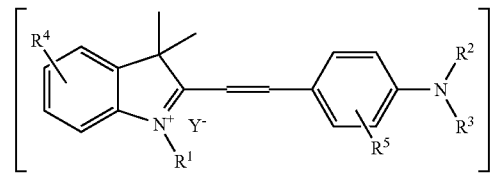

or formula (II), of:

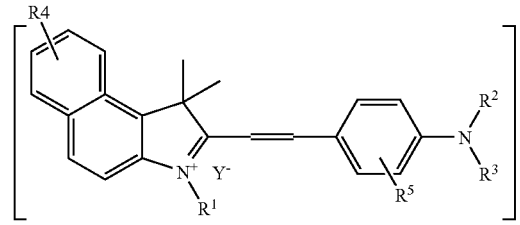

wherein $R^1$ is —$CH_2C_6H_4CO_2R^6$, —$CH_2SO_2C_6H_4F$, —$(CH_2)_n CO_2R^6$, —$(CH_2)_n SO_3R^6$, α-naphthylmethyl, or β-naphthylmethyl, wherein n is 1~8, and $R^6$ is polycyclic alkyl group, aryl group, fluoroaryl group, naphthyl group or —$C_6H_4SCH_3$, and $R^6$ is polycyclic alkyl group, fluoroaryl group, or —$C_6H_4SCH_3$ when $R^1$ is —$(CH_2)_nCO_2R^6$;

$R^2$ and $R^3$ are the same or different and comprised hydrogen atom, substituted or unsubstituted alkyl group having 1 to 8 carbon atoms, substituted or unsubstituted alkoxy group having 1 to 8 carbon atoms, or alkoxycarbonyl group, and $R^2$ and $R^3$ optionally comprise a heterocycloalkyl group, hetero-polycycloalkyl group, or heteroaryl group, with N or aniline bonded thereby;

$R^4$ and $R^5$ are the same or different and comprised hydrogen atom, alkyl group, alkoxy group, fluoroalkyl group, halogen atom, nitro group, carboxylic group, acyl group, sulfonic acid group, sulfonyl group, sulfoamide group, amino group or amide group;

$Y^-$ is tetracyano p-quinodimethane ($TCNQ^-$), tetracyanoethylene ($TCNE^-$), $ClO_4^-$, $SbF_6^-$, $PF_6^-$, $BF_4^-$, halogen anion, $HSO_3^-$, $HSO_4^-$, or organometallic anion, and at least one hydrogen atom bonded to the carbon atom of the indolestyryl compound according to formula (I) or formula (II) is substituted optionally by a halogen atom, carboxylic group, acyl group, nitro group, amino group, amide group, sulfonic acid group, sulfonyl group, sulfoamide group, alkyl group, alkoxy group, alkoxycarbonyl group, or fluoroalkyl group;

forming a reflective layer on the recording layer; and forming a second substrate on the reflective layer.

12. The method as claimed in claim 11, wherein the high-density recording medium has a reflective index of more than 45%, an absorption coefficient of more than $8 \times 10^4$ cm$^{-1}$, and a carrier-to-noise ratio of more than 50 dB at a measured writing power of 9 mW.

13. The method as claimed in claim 11, wherein the steps of forming the recording layer comprise:

providing an indolestyryl compound according to formula (I) or (II) to dissolve in a solvent, yielding an indolestyryl compound solution; and coating the indolestyryl compound solution on the first substrate to form the recording layer.

14. The method as claimed in claim 13, after coating the indolestyryl compound solution on the first substrate, further comprising subjecting the recording layer to a baking process.

15. The method as claimed in claim 13, wherein the solvent is alcohol, ketone, ether, halogen compound, cycloalkane, amide or combinations thereof.

16. The method as claimed in claim 15, wherein the alcohol is ethanol, isopropanol, diacetonalchol, 2,2,3,3-tetrafluoropropanol, trichloroethanol, 2-chloroethanol, octafluoropentanol, or hexafluorobutanol.

17. The method as claimed in claim 15, wherein the ketone is acetone, methyl isobutyl ketone, methyl ethyl ketone, or 3-hydroxy-3-methyl-2-butanone.

18. The method as claimed in claim 15, wherein the cycloalkane is methylcyclohexane (MCH).

19. The method as claimed in claim 15, wherein the halogen compound is chloroform, dichloromethane, or 1-chlorobutane.

20. The method as claimed in claim 15, wherein the amide is dimethylformamide, or dimethylacetamide.

21. The method as claimed in claim 13, wherein the indolestyryl compound solution is coated on the first substrate by spin coating, dip coating, embossing, stamping, thermal evaporation, or spray coating.

22. The method as claimed in claim 11, before forming the second substrate on the reflective layer, further comprising forming an adhesive layer on the reflective layer.

23. The method as claimed in claim 11, wherein the high-density recording medium is a high-density optical disc.

* * * * *